(12) United States Patent
Danel et al.

(10) Patent No.: US 7,699,599 B2
(45) Date of Patent: Apr. 20, 2010

(54) ROTATING MACHINE WITH ROTATING COLUMN FOR ELECTRICITY AND FLUID SUPPLY

(75) Inventors: Laurent Danel, Octeville-sur-Mer (FR); Gilles Robert, Octeville-sur-Mer (FR); Cyril Savary, Octeville-sur-Mer (FR); Patrick Mie, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 541 days.

(21) Appl. No.: 11/630,905

(22) PCT Filed: Jun. 21, 2005

(86) PCT No.: PCT/FR2005/001554
§ 371 (c)(1),
(2), (4) Date: Dec. 27, 2006

(87) PCT Pub. No.: WO2006/010807
PCT Pub. Date: Feb. 2, 2006

(65) Prior Publication Data
US 2007/0284789 A1    Dec. 13, 2007

(30) Foreign Application Priority Data
Jun. 28, 2004    (FR) .................................. 04 07077

(51) Int. Cl.
*B29C 49/36*    (2006.01)
(52) U.S. Cl. .................. 425/529; 425/535; 425/540
(58) Field of Classification Search ................ 425/535, 425/540, 529; 264/538, 539, 543; *B29C 49/36*
See application file for complete search history.

(56) References Cited

U.S. PATENT DOCUMENTS

| 3,310,834 | A | * | 3/1967 | Simpson et al. | 425/152 |
|---|---|---|---|---|---|
| 3,770,864 | A | * | 11/1973 | Bertrandi | 264/268 |
| 3,849,284 | A | * | 11/1974 | Kossmann | 204/625 |
| 3,936,521 | A | | 2/1976 | Pollock et al. | |
| 4,549,865 | A | * | 10/1985 | Myers | 425/342.1 |
| 4,698,012 | A | * | 10/1987 | Shelby et al. | 425/526 |
| 4,801,260 | A | | 1/1989 | Oles et al. | |
| 4,861,542 | A | | 8/1989 | Oles et al. | |
| 5,328,351 | A | * | 7/1994 | Schonebeck | 425/526 |
| 6,024,558 | A | * | 2/2000 | Looije et al. | 425/556 |
| 6,986,653 | B2 | * | 1/2006 | Unterlander et al. | 425/150 |

FOREIGN PATENT DOCUMENTS

| EP | 1566258 A2 | * | 8/2005 |
|---|---|---|---|
| FR | 87 759 E | | 12/1966 |
| JP | 63-256420 A | | 10/1988 |
| JP | 2003-212295 A | | 7/2003 |

* cited by examiner

*Primary Examiner*—Robert B Davis
(74) *Attorney, Agent, or Firm*—Sughrue Mion, PLLC

(57) ABSTRACT

The inventive carousel-type rotating machine includes a rotating frame bearing several work stations, a power and fluid supply rotating column which is coaxial to the axis of the rotating frame and incorporates a rotatable electric collector connected to a fixed power source for supplying power to the work stations and a rotatable fluid connection connected to a fixed fluid source for supplying fluid to the work stations, wherein the rotatable fluid connection is disposed on the top of the rotating column above the rotatable electric collector, thereby having the reduced diameter of the part thereof rotatable at reduced linear speeds between the fixed and rotatable parts thereof.

12 Claims, 5 Drawing Sheets

ROTATING MACHINE WITH ROTATING COLUMN FOR ELECTRICITY AND FLUID SUPPLY

FIELD OF THE INVENTION

The present invention relates to improvements made to rotating machines of the carousel type, having:
- a rotating frame rotatable about an axis of rotation,
- a plurality of workstations supported by the rotating frame,
- a rotating electricity and fluid supply column, coaxial with the axis of rotation of the rotating frame,
- at least one rotating electric collector, provided on said column and connected to a fixed electrical power source, for supplying electricity to said workstations, and
- at least one rotating fluid connection, provided on said column and connected to a fixed fluid source.

BACKGROUND OF THE INVENTION

It is emphasized here that the invention relates more specifically to rotating machines for manufacturing containers from thermoplastic material, particularly PET, by blow-molding or stretch-blowing a preform (intermediate container) in molds supported on a rotating frame, but the invention can be applied to other types of rotating machines such as filling machines.

FIG. 1 of the attached drawings shows a side view of a rotating electricity and fluid supply column installed at present in some machines for manufacturing containers by blow-molding or stretch-blowing, produced by the applicant (the principal parts of a machine of this type are sketched in a highly schematic way in FIG. 1).

The rotating machine of the carousel type comprises a fixed frame 1 supporting a rotating frame 2 which is rotatable (by the action of means which are not shown) about an axis 3 of rotation. The rotating frame 2 supports a plurality of workstations 4 distributed regularly around the periphery. More specifically, in the example considered here of a stretch-blowing machine for manufacturing containers, particularly bottles from thermoplastic material such as PET, each workstation 4 comprises, in particular, a mold 5, means 6 for controlling the preblowing fluid under relatively medium pressure (typically about $13 \times 10^5$ Pa) and the blowing fluid under relatively high pressure (typically about $40 \times 10^5$ Pa) and a rod 7 for mechanically stretching the container during the blowing, the rod 7 being moved axially by pneumatic actuating means 8 (of the air cylinder type) under relatively low pressure (typically $7 \times 10^5$ Pa).

The machine also has a rotating electricity and fluid supply column 9 which extends coaxially with the axis 3 of rotation of the rotating frame, and which can supply the electricity and the various fluids required for the operation of the workstations 4 from respective fixed sources.

For this purpose, the rotating column 9 comprises a rotating electric collector 10, located at the top of the rotating column 9, which is supplied by a fixed electrical cable 11. In a conventional way, the rotating electric collector has fixed or rotating tracks on which rotating or fixed brushes, respectively, bear resiliently, the assembly being protected by a casing 12, shown in FIG. 1 only, which is fixed and retained by an anti-torque structure 13 (shown schematically in the form of a bracket) fixed to the fixed frame 1.

Below the rotating electric collector 10 there is an axially positioned rotating fluid connection 14, of which only the casing 15, fixed and retained by the anti-torque structure 13, is shown in FIG. 1. The rotating fluid connection 14 is connected to a source of pneumatic fluid under relatively high pressure (generally air at about $40 \times 10^5$ Pa) by a pipe 16 and to a source of pneumatic fluid under relatively low pressure (in practice, air at the industrial pressure of $7 \times 10^5$ Pa) by a pipe 17, the two pipes 16 and 17 being fixed and supported, for example, by the anti-torque structure 13.

The base 18 of the rotating supply column 9, with which it rests on the fixed frame 1, is also fixed. The rotating part, or rotor, of the rotating column 9 is indicated as a whole by the reference 19 in FIG. 1.

The supplies are provided to the workstations in the following manner.

The electrical output cables of the rotating electric collector 10, which are indicated by the reference 20, are fixed to the rotor 19 of the rotating column 9 and, in order to keep them disengaged from the anti-torque structure 13, are made to pass through the rotating fluid connection 14 while being functionally associated with the rotor 19, after which, at the outlet of the rotating fluid connection 14, they are connected to an electrical distribution box 21 supported by the rotating frame used for supplying electricity to the electrical components of workstations (solenoid valves, for example).

The pneumatic fluid is taken from the outlet of the rotating fluid connection 14 through the rotor 19 which is of hollow construction (an example of the structure of the rotating fluid connection 14 is described below with reference to FIGS. 2A and 2B), toward a rotating fluid distributor 22 located under the rotating fluid connection 14. The distributor 22 has a first stage consisting of connections 23, distributed peripherally for the distribution of the pneumatic fluid under low pressure and connected at 24 to the means 8 for actuating the stretching rod 7. The distributor 22 also has a second stage consisting of connections 25 distributed peripherally for the distribution of the pneumatic fluid under high pressure (blowing) and connected at 26 to the aforesaid means 6 for controlling the preblowing and/or blowing fluid. Finally, the distributor 22 also has a third stage consisting of connections 27 distributed peripherally for the distribution of the pneumatic fluid under medium pressure (preblowing) and connected at 28 to the aforesaid means 6 for controlling the preblowing and/or blowing fluid; the fluid under medium pressure (typically $13 \times 10^5$ Pa) is normally obtained by drawing fluid under high pressure at 29 from the corresponding stage of the distributor, this fluid being expanded in a pressure reducer 30 to bring it to the requisite pressure and finally being stored in a buffer reservoir 31 (for example, one incorporated in a structure 66 of the rotor 19 as shown in FIG. 1) which is connected to the aforesaid third stage of connections 27.

Finally, below the buffer reservoir 31, the rotor has a liquid distributor 32 which is designed for distributing the requisite water and oil at 33 and 34 to each workstation, for regulating the temperature of the molds 5 for example.

An assembly flange 63 is provided at the base of the distributor 22 to enable it to be fixed removably to the underlying part 66 of the rotor 19.

In FIGS. 2A and 2B of the attached drawings, the rotating fluid connection 14 is shown in diametric sections taken along two respective perpendicular planes. The fixed outer part or casing 15 is provided with a first radial bore 35, for the admission of fluid under high pressure (arriving from the pipe 16), which opens into a first annular distribution chamber 36, and with a radial opening 37 formed by a second bore, located below the first bore, for the admission of fluid under low pressure (arriving from the pipe 17), which opens into a second annular distribution chamber 38.

Inside the casing 15, the rotating part 39 of the rotating fluid connection 14 (which forms one of the elements of the rotor 19 of the rotating column 9) has a first radial bore 40 facing the first annular distribution chamber 36 of the casing 15 and an axial bore 41 opening into this first radial bore 40 and extending downward toward the underlying rotating fluid distributor 22 (shown in FIG. 1). The rotating part 39 has a second radial bore 42 facing the second annular distribution chamber 38, the said second radial bore 42 opening into the axial bore 41. Finally, a central tube 43 is mounted in the axial bore 41, coaxially with the latter; the central tube 43 has a smaller outside diameter than that of the axial bore 41, in such a way that an annular passage 44 is formed between the central tube 43 and the axial bore 41; additionally, the upper end of the central tube 43 is fixed in a sealed way to the axial bore 41 in the part of the latter located between the two radial bores 40 and 42.

Because of this arrangement, the central tube 43 carries in an axial direction the pneumatic fluid under high pressure delivered by the pipe 16 via the first annular distribution chamber 36 and the first radial bore 40, while the annular passage 44 carries in a peripheral direction the pneumatic fluid under low pressure delivered by the pipe 17 via the second chamber 38 and the second radial bore 42.

As shown in FIG. 2B, drawn in a perpendicular section plane, the rotating part 39 of the rotating fluid connection 14 is also provided with a bore 45 parallel to its axis and to the axial bore 41, but offset radially toward the periphery of the rotating part 39, in such a way that it passes outside the axial bore 41, extending over approximately the whole height of the rotating part 39. The off-centered bore 45 is intended for the passage of the electrical cable or cables 20 which extend from the outlet of the rotating electric collector 10 to the electrical distribution box 21, as mentioned above.

In some cases, the structure is provided with a plurality of bores among which the cables are distributed, instead of being provided with a single off-centered bore 45 for the passage of the cables.

A rotating electricity and fluid supply column 9 designed as described above is currently fitted to many machines manufactured by the applicant, and has proved entirely satisfactory in respect of its function. However, this known column has a number of drawbacks due to its structure, and more specifically due to the relative positions of the rotating electric collector 10 and the rotating fluid connection 14.

Because of the position of the rotating fluid connection 14 located below the rotating electric collector 10, any servicing work carried out on the rotating fluid connection 14 requires the dismantling of the rotating electric collector 10, with all the operations necessitated by this (electrical isolation of the machine, disconnection of the cables, separation of the anti-torque structure, check of the correctness of the connections after reassembly, etc.). In current practice it has been found that servicing is performed relatively rarely on the rotating electric collector 10, whereas the rotating fluid connection requires regular servicing.

One important reason for the servicing work is the need for regular replacement of the seals 46 between the fixed part and the rotating part, which have a relatively short lifespan. Owing to the presence of the off-centered bore or bores 45, the rotating part 39 of the rotating fluid connection has been designed with a relatively large diameter (typically from 110 to 150 mm in the applicant's machines). Consequently, the linear velocity of the rotating part relative to the fixed part is high. Because of this, the seals undergo accelerated mechanical wear.

Furthermore, this high relative velocity causes a relatively intense heating of the seals (whose temperature can be raised to about 100° C., for example). This heating is communicated to the metal parts and particularly to the rotor, which, for reasons described above, is massive and therefore difficult to cool. This unfavorable thermal environment considerably affects the lifespan of the seals.

Moreover, the seals 46 are housed in grooves machined in the wall of the casing 15 (closed groove fitting). Since the seals 46 are made from a relatively rigid material, they must be deformed to their cores in order to fit them, so that they can be inserted into the casing until they reach their respective grooves in which they are subsequently expanded. However, the constituent material of the seals is not resilient, and, when inserted into their grooves, the seals do not easily return to their annular shape, and therefore manual intervention is required in order to shape them correctly.

Consequently, users urgently require improvements to this part of the machine, in order to simplify maintenance and increase the time between services, so that the machines can become more efficient and productive.

BRIEF DESCRIPTION OF THE INVENTION

The object of the invention is therefore to propose a rotating supply column with an improved structure which responds more satisfactorily to the various practical requirements.

For this purpose, the invention proposes a machine as described in the preamble, which is characterized in that the rotating fluid connection is located at the top of the column, above the rotating electric collector.

Because of this design, the process of servicing the rotating fluid connection is considerably simplified, since in this case there is direct access to said rotating fluid connection without the need to dismantle the rotating electric collector beforehand. The time required for a servicing operation thus becomes considerably shorter and less complicated.

Furthermore, the output cable or cables of the rotating electric collector, which emerge from below the latter, are no longer interfered with by the anti-torque structure which is fixed to the casing of the rotating electric collector: these cables can therefore be connected directly to the electrical distribution box without the need to pass through the rotating fluid connection. Thus the rotating fluid connection can be made with a rotating part of smaller diameter: tests have been conducted successfully with a rotor of the rotating fluid connection having a diameter of less than 50 mm, in other words a diameter reduced by a factor of about 3 with respect to those used previously. This small diameter reduces the linear velocities of the rotating parts relative to the fixed parts, considerably reducing the mechanical wear on the seals. Furthermore, this reduced linear velocity causes less heating of the seals, while the smaller mass of the rotor enables it to be cooled more quickly: in the final analysis, the thermal conditions are thus improved, and have a favorable effect on the lifespan of the seals.

In the final analysis, the time between successive servicing operations can be increased considerably or even multiplied several times. Typically, a seal lifespan of about 15,000 hours (in other words, approximately two years of operation of the machine) becomes feasible with the arrangements according to the invention.

In a preferred embodiment, the machine has at least one rotating fluid distributor, provided on said column and connected to said rotating fluid connection, for the selective distribution of fluid to said workstations; in this case, the rotating fluid distributor is located on the column below the rotating electric collector, and the rotating electric collector is designed in annular form and delimits an axial central passage for the fluid flowing from the rotating fluid connection toward the fluid distributor.

In this case, it is advantageous to provide the rotating fluid connection with a fixed casing closed by a fixed cover, this cover is located at the top of the column, has an axial fluid supply opening, and covers the end of an axial central tube of a rotor, this central tube is in fluid communication with said opening and extends to the fluid distributor.

Although the arrangements of the invention can be applied to the transfer of any type of fluid, whether liquid or gaseous, a preferred application of the invention relates to an electrically and pneumatically operated machine and, in this context, the fluid is a gas (such as air) under relatively high pressure.

In a variant of this type of machine, in which the rotating fluid connection is designed to additionally deliver a gas under relatively low pressure, the aforesaid fixed casing is provided with a radial opening for the supply of gas under relatively low pressure, and the rotor is provided, around the central tube, with an annular passage having through holes which link said radial opening with said annular passage.

In a particularly useful embodiment made possible by the aforesaid structure, the aforesaid cover forms an axial housing receiving sealing means interposed between the end of the central tube and the fixed casing, and is removable to allow access to said sealing means. In this way, access to the sealing means is made particularly easy and they can be replaced very quickly. It also becomes possible to make these sealing means in the most appropriate and effective way; for example, it is possible to arrange for the sealing means for the fluid under relatively high pressure to comprise a single seal or a double seal having two superimposed seals separated by a spacer, so as to provide reliable sealing in the presence of the fluid under relatively high pressure. It should be noted that the proposed design provides easy and rapid access to the sealing means (open groove fitting) and the seal or seals can be fitted axially without the need to deform them.

It should also be noted that the structure of the rotating fluid connection according to the invention makes it possible to produce the sealing means in the form of a dry gasket seal.

As indicated by the above explanations, the arrangements of the invention which have just been described can be applied in a particularly useful way, although not exclusively, to a rotating machine designed for the molding of containers in thermoplastic material, particularly PET, by blow-molding or stretch-blowing preforms in peripherally distributed molds which are connected to said rotating supply column for their supply with electricity and with pneumatic blowing fluid under relatively medium pressure for preblowing, fluid under relatively high pressure for blowing, and fluid under relatively low pressure for moving a stretching rod. It is also possible to consider providing the fluid structure with passages for the return of blowing fluid toward an air recovery circuit, particularly for use in the medium pressure pneumatic circuit used in particular for preblowing.

To give an idea of the possibilities, it is worth mentioning that, in the typical application to blowing machines, the changing of the sealing means of the relatively high pressure blowing air circuit can, in a machine designed in accordance with the invention, be completed successfully in about half an hour, as compared with approximately four hours in current machines.

It should also be emphasized that the application of the arrangements according to the invention, with the reversal of the positions of the rotating fluid connection and the rotating electric collector, does not require a redesign of the geometry of the flange for mounting the upper unit of the column (formed by the assembly consisting of the rotating electric collector and rotating fluid connection) on the fluid distributor. The novel assembly designed according to the invention can therefore be fitted to an existing machine in place of the earlier assembly.

BRIEF DESCRIPTION OF THE DRAWINGS

The invention will be more easily understood with the aid of the following detailed description of some preferred embodiments, provided solely by way of example and without restrictive intent. This description makes reference to the attached drawings, in which.

DETAILED DESCRIPTION OF THE INVENTION

Figure 1:
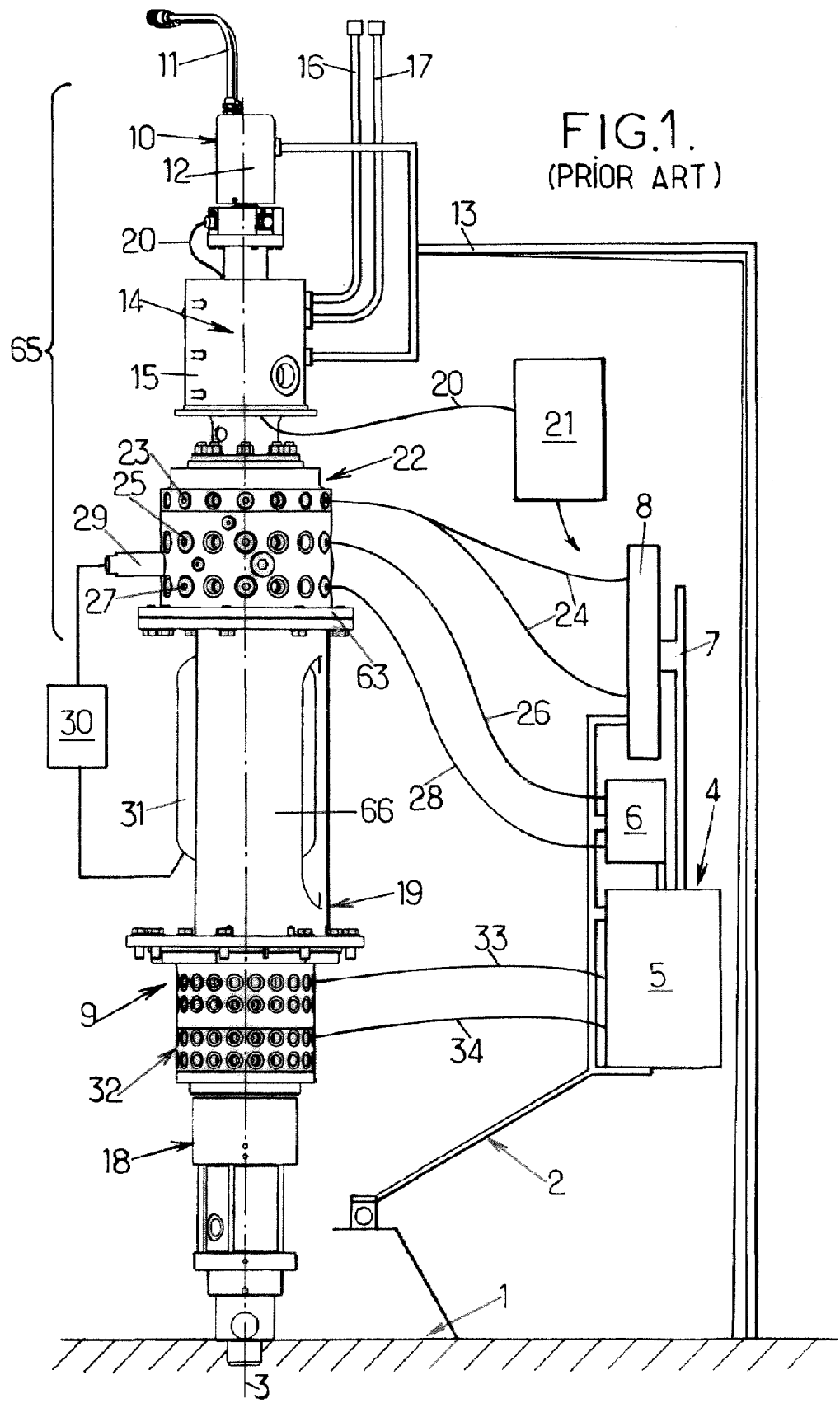
FIG. 1 is a highly simplified schematic view of a rotating machine to which the invention relates, with a rotating electricity and fluid supply column according to the prior art, shown in a relatively detailed way.
Figure 2B:
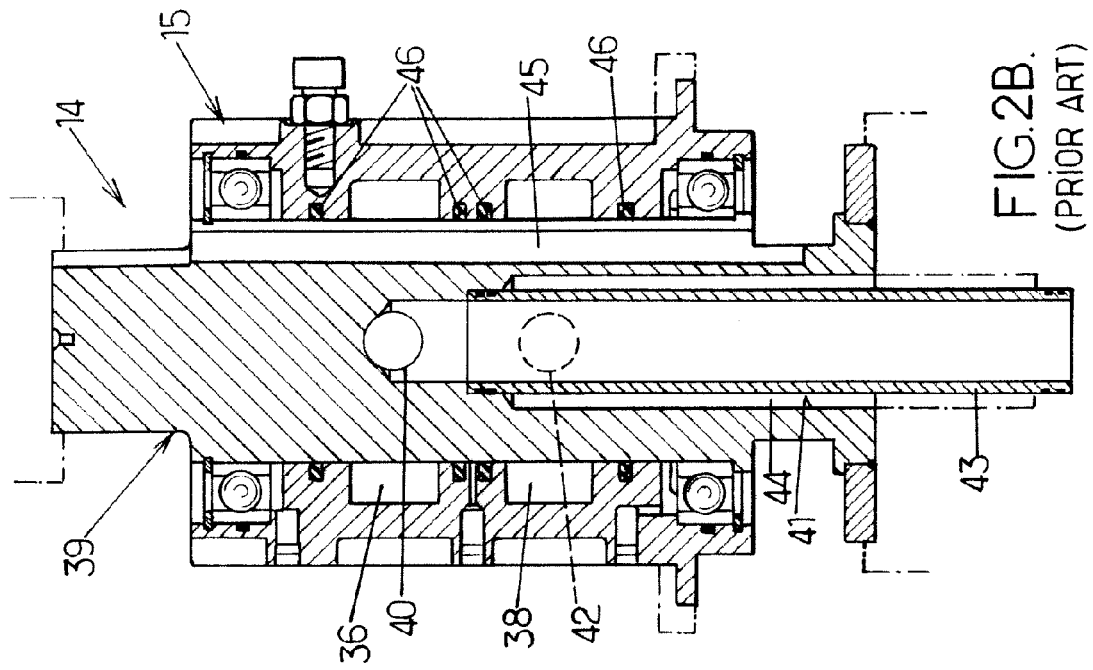
FIGS. 2A and 2B are two side views, in diametric sections taken along two perpendicular planes, of the rotating fluid connection according to the prior art applied to the machine of FIG. 1.
Figure 2A:
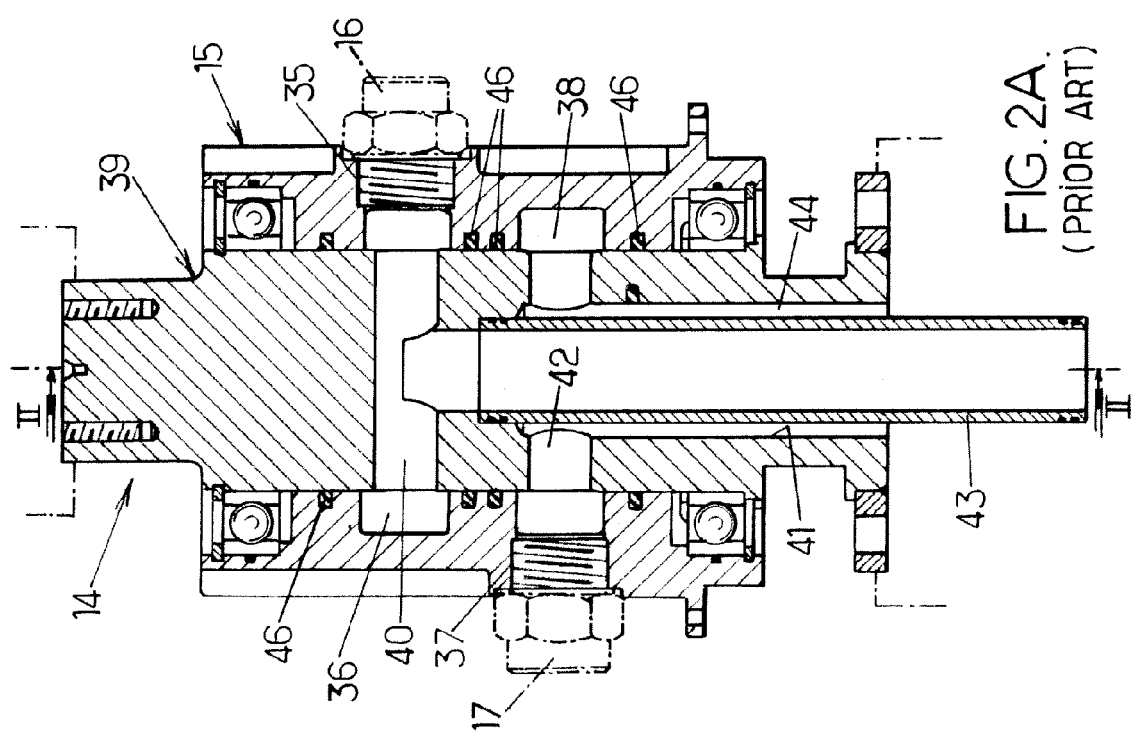
Figure 3:
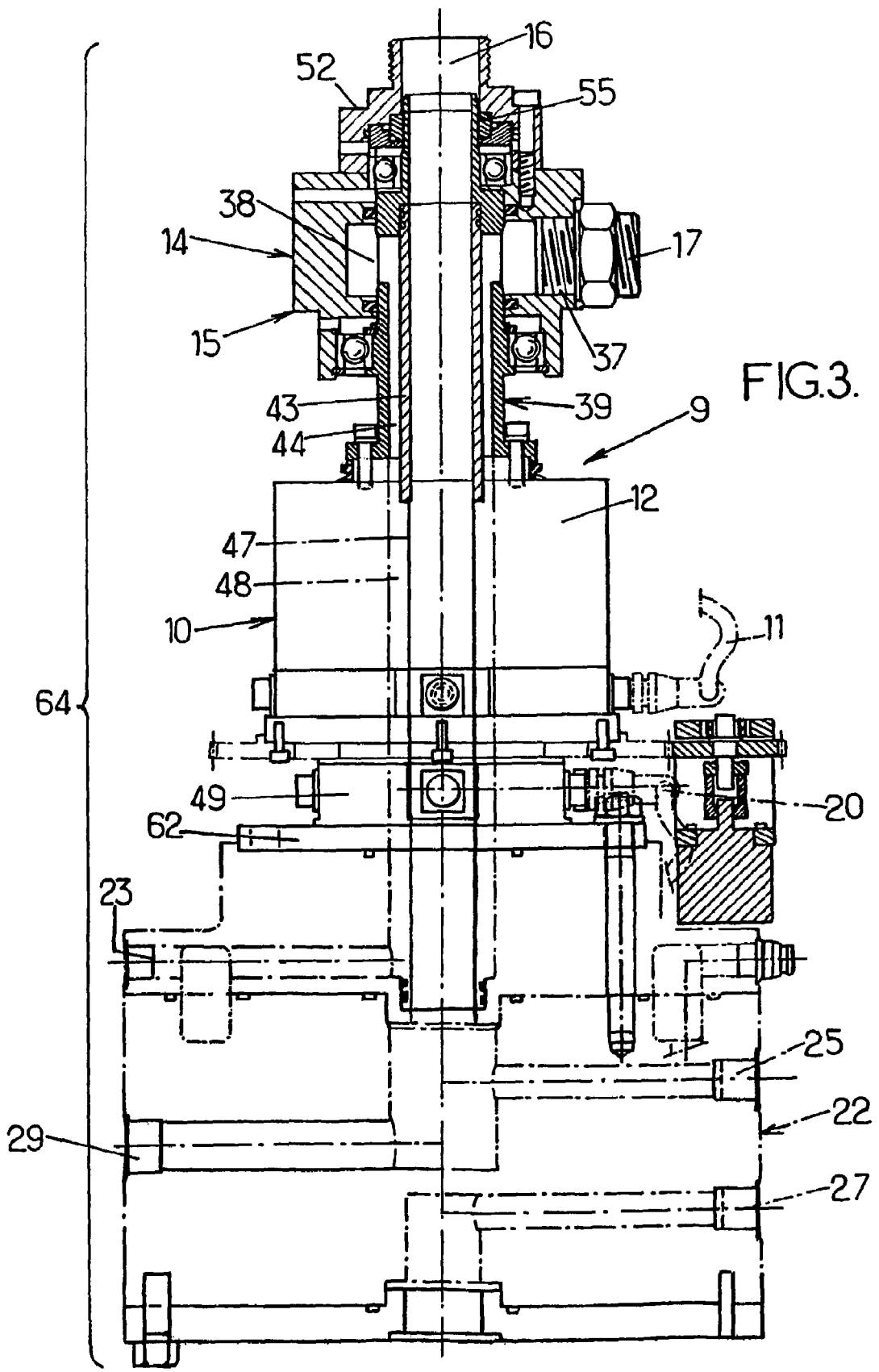
FIG. 3 is a schematic view showing in a simplified way the upper part, designed according to the invention, of the rotating column of the machine of FIG. 1.

FIG. 3 shows the upper part of the rotating column 9 designed according to the invention, the same members or parts as in FIGS. 1, 2A and 2B being indicated by the same reference numerals.

According to the invention, the respective positions of the rotating electric collector 10 and the rotating fluid connection 14 are reversed, the rotating fluid connection 14 being placed above, at the top of the rotating column 9, while the rotating electric collector 10 is placed below. It is particularly advantageous for the rotating electric collector 10 to be placed between the rotating fluid connection and the rotating fluid distributor 22, as shown in FIG. 3. In these conditions, the rotating electric collector 10 must be designed in annular form, so that its central part remains available for the passage of the fluids (via a central tubular pipe 47 extending the central tube 43, and an annular passage 48 extending the passage 44) from the rotating fluid connection 14 to the rotating fluid distributor 22. For the remainder, it should be noted that the fixed electrical supply cable 11 is connected to the casing 12 (radially in this case), while the rotating electrical output cable 20 from the rotating electric collector 10 emerges radially from the rotating part 49 of the rotating electric collector 10 which is fixed to the rotating fluid distributor 22.

Figure 4:
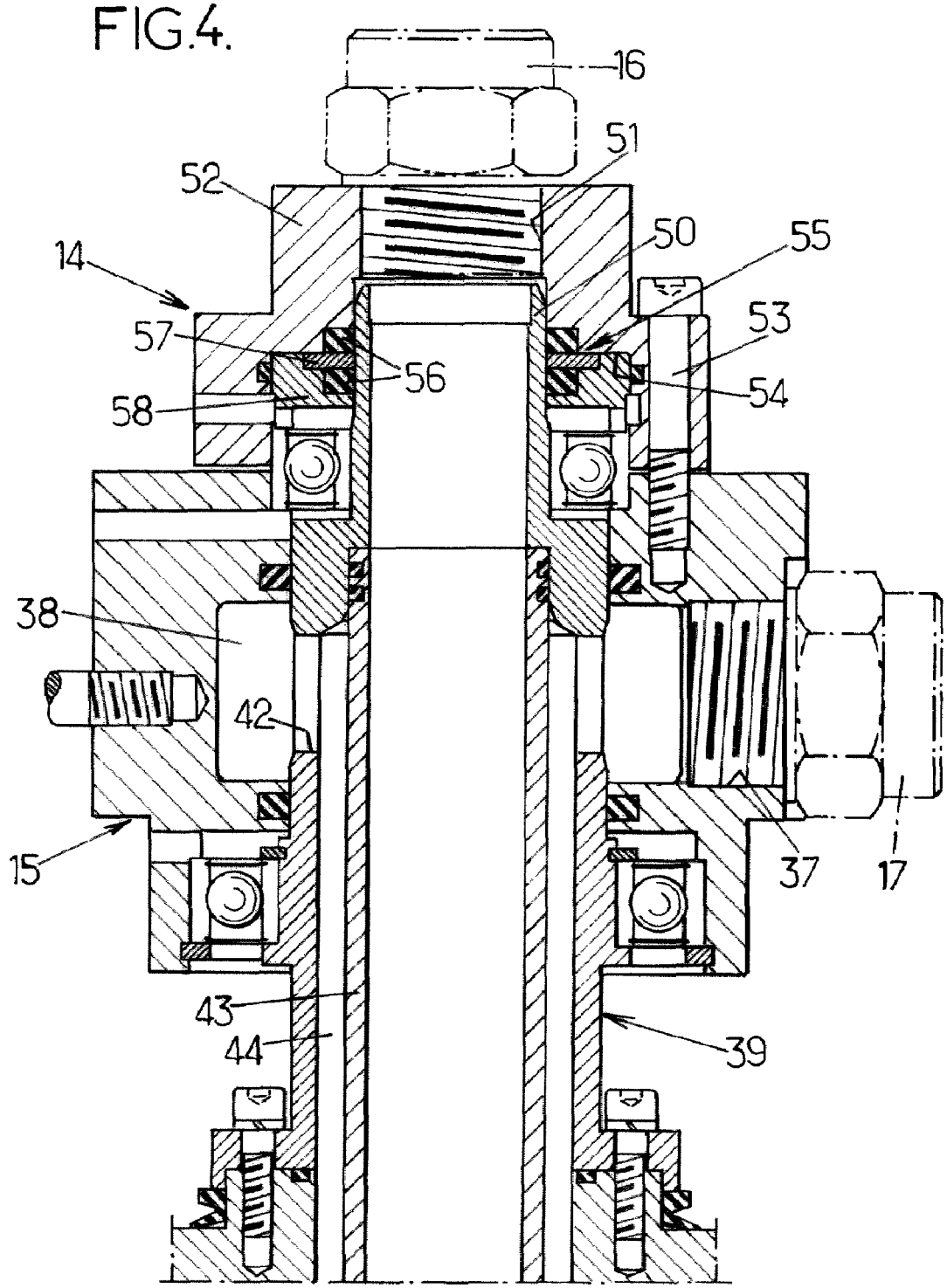
FIG. 4 is a view in diametric section of a rotating fluid connection designed according to the invention for fitting to the machine of FIG. 3.

The rotating fluid connection 14 is shaped as shown more fully in FIG. 4, in which the same reference numerals are used to indicate members identical to those of FIGS. 2A and 2B. The rotating part 39 no longer has to be designed for the passage of the output cable or cables from the rotating electric collector 10, and can therefore be made in the general form of a small-diameter tubular element which receives the central tube 43 in its center, thus forming the annular passage 44. The upper end 50 of the rotating part 39 is shaped in the form of a sleeve having a small diameter (substantially identical to that of the central tube 43).

The upper part of the casing 15 is provided with an axial opening 51 which opens in the immediate proximity of the aperture of the sleeve-like upper end 50 of the rotating part 39, and is connected to the pipe 16 for the supply of fluid, typically gas (air) under high pressure in the illustrated example of a blow-molding or stretch-molding machine.

The upper part of the casing 15 is conveniently designed in the form of a cover 52 which can fit over the sleeve-like upper end 50 of the rotating part 39 and which is fixed removably (by a system of bolts 53, for example) to the casing 15.

The cover 52 can be shaped internally to form an axial housing 54 to receive sealing means 55 providing sealing with respect to the fluid under relatively high pressure between the sleeve-like upper end 50 of the rotating part 39 and the cover 52. It is possible to form the sealing means 55 in a particularly effective way from two seals 56 separated by an intermediate spacer 57, the assembly being locked in the housing 54 by means of a locking ring 58.

Because of the configuration given to the cover 52, the sealing means 55 are easily accessed when the cover has been removed, and the seals 56 can be replaced without the need to deform them (open groove fitting).

Figure 5:
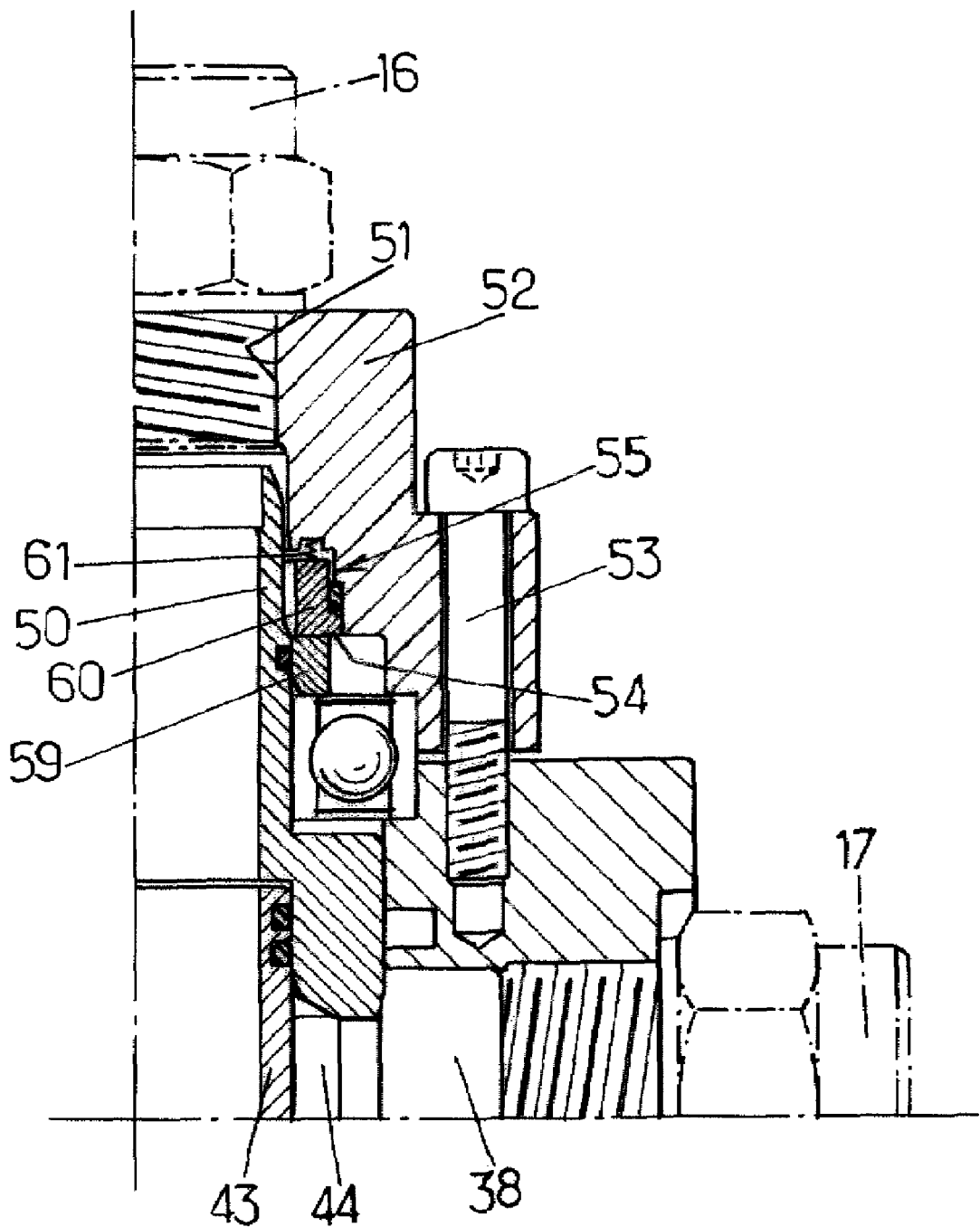
FIG. 5 is a partial sectional half-breadth view showing a variant embodiment of part of the rotating fluid connection of FIG. 4.

The design described above is equally suitable for the application of dry gasket sealing means as shown in FIG. 5, which in other respects matches the right-hand half-breadth view of the upper part of FIG. 4. Here the two seals 56 of FIG. 4 are replaced by a sealing system with a longer lifespan, comprising an annular gasket 59, such as a rotating plate, carried by the outer face of the sleeve-like upper end 50, and projecting therefrom, and a second gasket 60, complementary to the first, for example a fixed plate or seal, which is supported above the gasket 59 by the inner face of the housing 54 of the cover 52, with means 61 such as a spring pushing the second gasket 60 into contact with the annular gasket 59. The radial seal provided by the seals 56 is replaced by an axial seal between the second gasket 60 and the annular gasket 59.

It should be emphasized that the rotor of the rotating column 9, indicated above by the reference 19, is in fact formed by the rigid end-to-end assembly of the rotating parts of each of the devices making up the rotating column 9. Thus, as shown in FIG. 3, the rotating part 39 of the rotating fluid connection 14 is fixed (by a system of bolts as shown, for example) to the rotating part 49 of the rotating electric collector 10, which itself is fixed (by a system of bolts as shown, for example) to the rotating fluid distributor 22. In the context of the arrangements according to the invention described above, it is possible to give the assembly flange 62 of the rotating part 49 of the rotating electric collector 10 a configuration (in terms of the shape, the dimensions, and the positions of the holes for the mounting bolts) similar to the current configuration of the assembly flange 63 provided on the rotor of the rotating fluid connection 14 (see FIG. 1). This makes it possible for the assembly 64, which according to the invention is formed by the rotating fluid connection 14, the rotating electric collector 10 surmounted by the rotating fluid connection 14, and the distributor 22, to be substituted for the assembly 65 formed, in prior art machines, by the rotating electric collector 10, the rotating fluid connection 14 surmounted by the rotating electric collector 10, and the distributor 22: an assembly 64 according to the invention can therefore be fitted to a machine which is already in service, in place of the existing assembly 65.

As indicated by the above explanations, the arrangements according to the invention which have just been described here can be applied particularly usefully, but not exclusively, to a rotating machine as shown in FIG. 1, designed for molding containers from thermoplastic material, particularly PET, by blow-molding or stretch-blowing preforms in peripherally distributed molds 5 which are connected to said rotating supply column 9 to supply them with electricity and with pneumatic blowing fluids under medium pressure for preblowing, under high pressure for blowing, and under low pressure for moving a stretching rod 7.

The invention claimed is:

1. A rotating machine of the carousel type, comprising:
   a rotating frame rotatable about an axis of rotation,
   a plurality of workstations supported by the rotating frame,
   a rotating electricity and fluid supply column, coaxial with the axis of rotation of the rotating frame,
   at least one rotating electric collector, provided on said rotating column and connected to stationary electrical power source, for supplying electricity to said workstations, and
   at least one rotating fluid connection, provided on said rotating column and connected to stationary fluid source, for supplying fluid to said workstations, said rotating fluid connection comprising a rotating part,
   wherein the rotating fluid connection is located at the top of the rotating column, above the rotating electric collector, whereby the rotating part of the rotating fluid connection can be made with a smaller diameter, resulting in lower linear relative velocities between stationary and rotating parts of said rotating fluid connection.

2. The machine as claimed in claim 1, further comprising at least one rotating fluid distributor, provided on said rotating column and connected to said rotating fluid connection, for the selective distribution of fluid to said workstations, wherein the rotating fluid distributor is located on the rotating column below the rotating electric collector.

3. The machine as claimed in claim 2, wherein the rotating fluid connection comprises a stationary casing closed by a stationary cover, which cover is located at the top of the rotating column, has an axial fluid supply opening and caps the upper end of an axial central tube of the rotating part of the rotating fluid connection, which central tube is in fluid communication with said opening and extends to the rotating fluid distributor.

4. The machine as claimed in claim 1, wherein the fluid is a gas under relatively high pressure.

5. The machine as claimed in claim 1, in which the rotating fluid connection is designed to further deliver a gas under relatively low pressure, wherein said stationary casing includes a radial relatively low pressurized fluid supply opening and wherein the rotating part of the rotating fluid connection comprises, around the central tube, an annular passage in communication with said radial opening via a radial bore.

6. The machine as claimed in claim 2, wherein said cover delimits an axial housing which receives sealing means interposed between the end of the central tube and the stationary casing, and is removable to allow access to said sealing means.

7. The machine as claimed in claim 6, wherein the sealing means comprise a double seal including two superimposed seals spaced by a spacer.

8. The machine as claimed in claim 6, wherein the sealing means comprise a dry gasket seal.

9. A rotating machine designed for molding containers from thermoplastic material, particularly PET, by blow-molding or stretch-blowing preforms in peripherally distributed molds which are connected to said rotating supply column for the supply thereof with electricity and with pneumatic blowing fluid under relatively medium pressure for preblowing, fluid under relatively high pressure for blowing, and fluid under relatively low pressure for controlling the movement of a stretching rod, which is constructed as claimed in claim 1.

10. The machine as claimed in claim 1, wherein the rotating electric collector is annularly designed and delimits an axial central passage in communication with said rotating fluid connection.

11. The machine as claimed in claim 2, wherein the rotating electric collector is annularly designed and delimits an axial central passage for the fluid flowing from the rotating fluid connection toward the rotating fluid distributor.

12. The machine as claimed in claim 1, wherein the workstations comprise solenoid valves.

* * * * *